United States Patent [19]

Beach et al.

[11] Patent Number: 5,056,684
[45] Date of Patent: Oct. 15, 1991

[54] ROOFING WASHER-DISPENSING MACHINE

[75] Inventors: John R. Beach, Elmhurst; Syed R. Hasan, Palatine, both of Ill.

[73] Assignee: Illinois Tool Works Inc., Glenview, Ill.

[21] Appl. No.: 432,006

[22] Filed: Nov. 6, 1989

Related U.S. Application Data

[63] Continuation-in-part of Ser. No. 311,013, Feb. 15, 1989, Pat. No. 4,890,968.

[51] Int. Cl.⁵ ............................................... B65H 1/00
[52] U.S. Cl. .................................... 221/197; 221/186; 221/198; 221/276; 221/312 R; 81/57.37; 81/431; 227/120
[58] Field of Search ................ 221/191, 186, 197, 272, 221/274, 276, 281, 287, 303, 312 R, 198; 81/57.37, 431; 312/42; 227/120

[56] References Cited

U.S. PATENT DOCUMENTS

| | | | |
|---|---|---|---|
| 2,215,850 | 9/1940 | Holdeman | 221/312 R |
| 2,635,026 | 4/1953 | Kreul | 221/312 R |
| 3,935,983 | 2/1976 | Buttriss | 227/120 X |
| 4,037,756 | 7/1977 | Jaquish | 312/42 X |
| 4,091,850 | 5/1978 | Kjölsrud | 81/57.37 X |
| 4,246,939 | 1/1981 | Boegel | 81/431 X |
| 4,657,167 | 4/1987 | Mays | 81/431 X |
| 4,870,750 | 10/1989 | Zahn | 81/431 X |
| 4,890,968 | 1/1990 | Beach et al. | 411/531 |

Primary Examiner—Joseph E. Valenza
Assistant Examiner—Tuan N. Nguyen
Attorney, Agent, or Firm—Schwartz & Weinrieb

[57] ABSTRACT

A roofing washer-dispensing machine having improved features is disclosed. A novel magazine comprises a substantially box-like container with a substantially open face, for housing a stack of circular roofing washers having inserts, and a substantially rigid rod removably mounted within or upon to a top wall of the box so as to extend downwardly into the central apertures of the stack washers, except for the lowermost washer, so as to restrain the remaining washers. The machine comprises a shuttle arranged to displace the lowermost washer from the stack when it is desired to dispense such washer. The shuttle includes a novel arrangement of means overlying and underlying marginal portions of such washer.

20 Claims, 3 Drawing Sheets

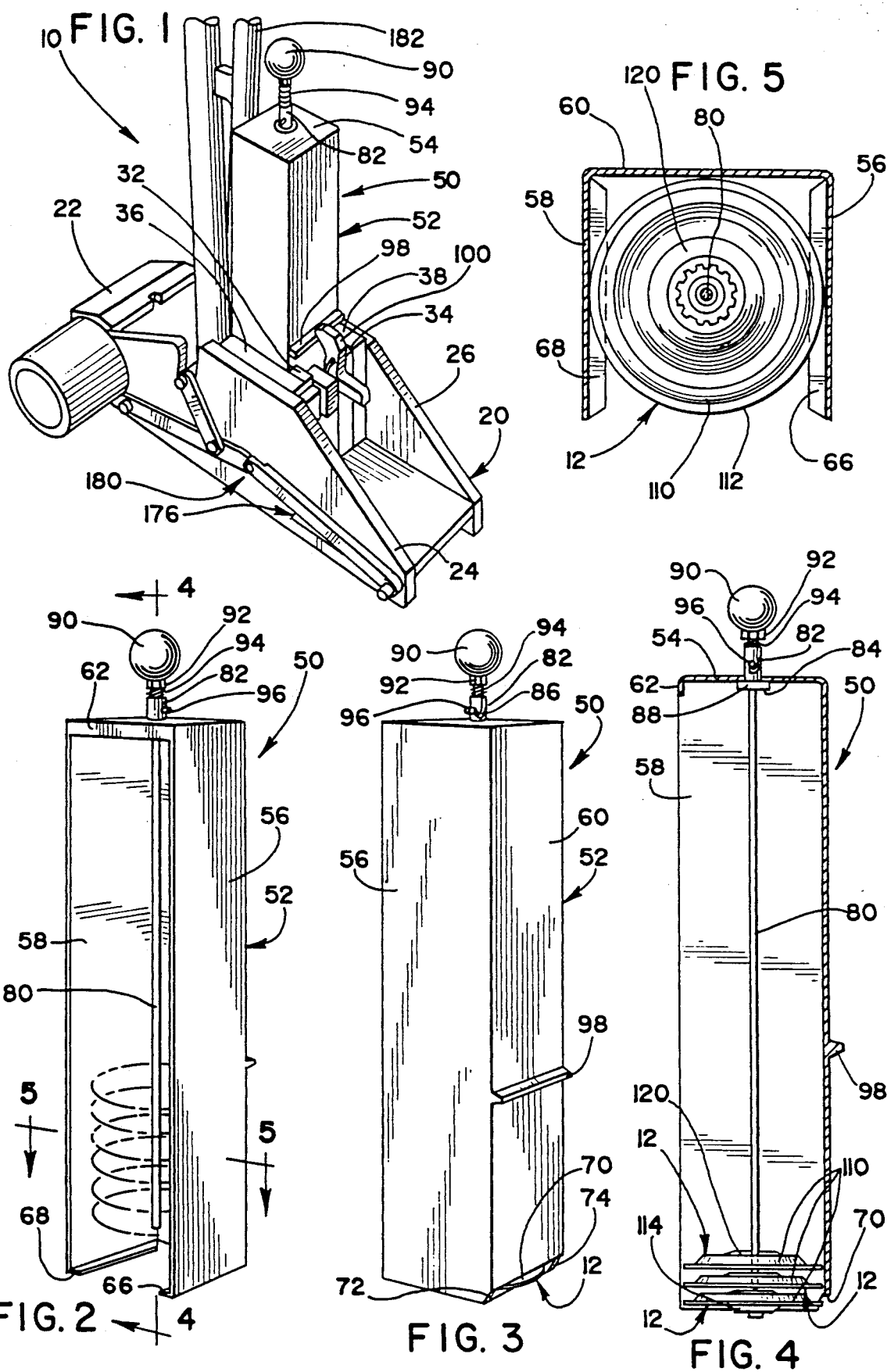

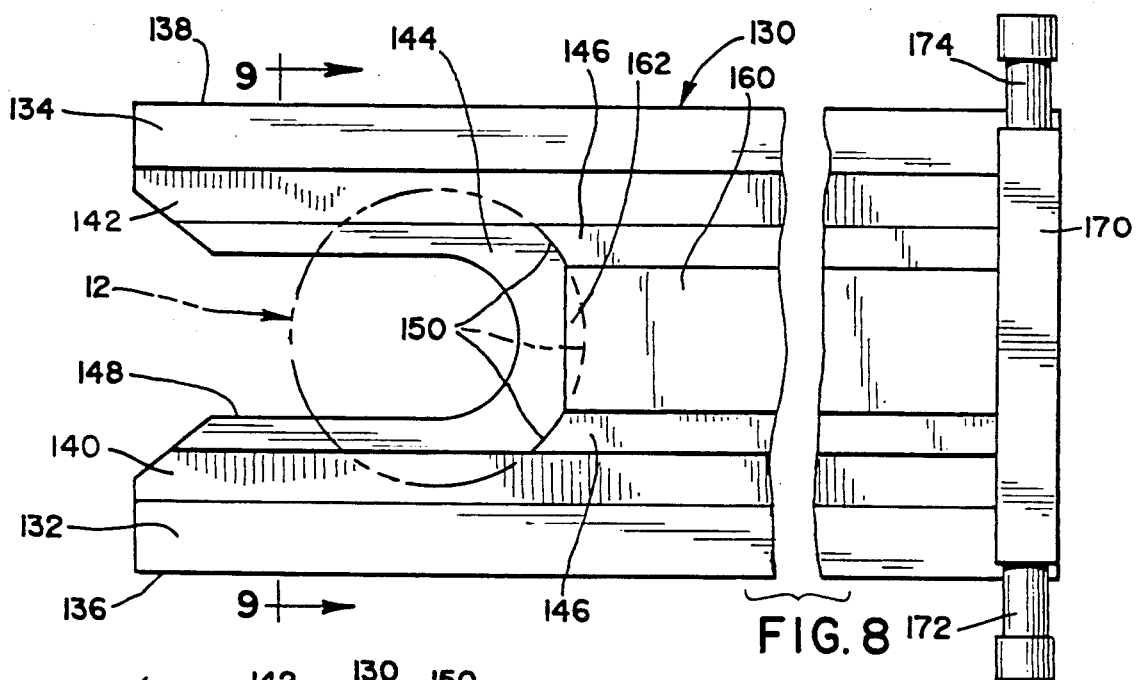
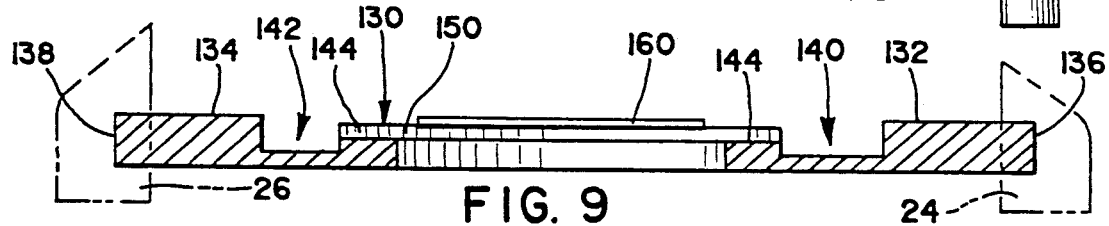
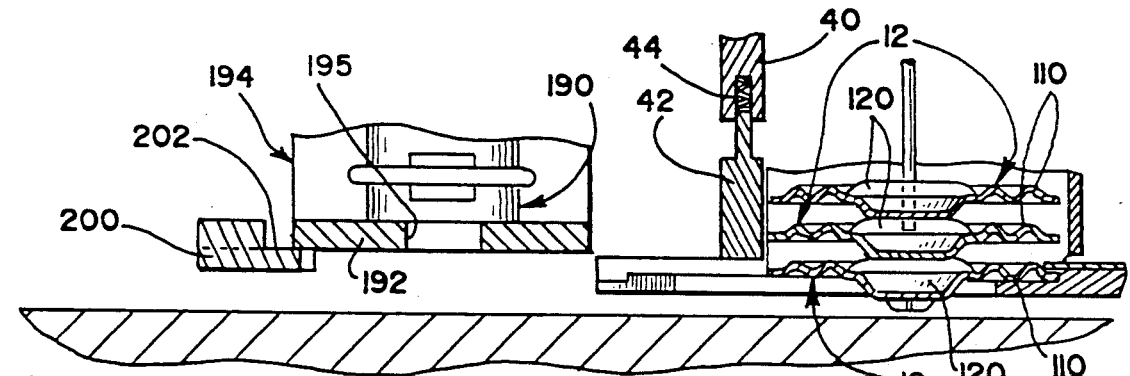
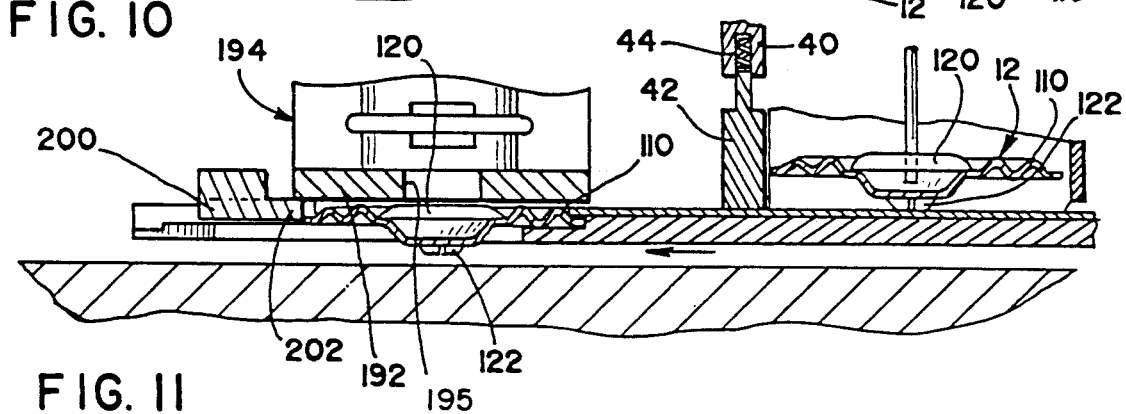

ROOFING WASHER-DISPENSING MACHINE

CROSS-REFERENCE TO RELATED APPLICATION

This application is a continuation-in-part of copending U.S. Pat. application Ser. No. 311,013, which was filed Feb. 15, 1989, and which has now been patented as U.S. Pat. No. 4,890,968 issued Jan. 2, 1990.

TECHNICAL FIELD OF THE INVENTION

This invention pertains to improvements in a washer-dispensing machine, or a washer-dispensing and fastener-driving machine, which is useful to dispense roofing washers individually from a stack of such washers. Such a washer-dispensing and fastener-driving machine is disclosed within the copending application noted above.

BACKGROUND OF THE INVENTION

The copending application noted above discloses an improved machine for fastening one or more layers of roofing material, such as, for example, a blanket of roofing insulation or a roofing membrane, to an underlayment, such as, for example, a wooden roof or a corrugated metal roof. The improved machine dispenses roofing washers individually onto such material and drives a fastener having a head, such as, for example, a screw, through a central aperture of each dispensed washer through such material, and into the underlayment, until the head of the fastener bears against such dispensed washer.

The improved machine disclosed in the copending application noted above is satisfactory for many applications, particularly if substantially square roofing washers are used, as disclosed in such copending application. It has been found, however, that it can be difficult to use circular roofing washers in such a machine. Thus, there has been a need, to which this invention is addressed for further improvements in such a machine.

Herein, as in the copending application noted above, such terms as "roof" and "roofing" are to be broadly understood, so as to cover roofs, decks, ceilings, and similar structures.

SUMMARY OF THE INVENTION

This invention provides improved features in and for a washer-dispensing machine useful to dispense stackable roofing washers individually from a stack of such washers. These features permit such a machine to be advantageously used with circular roofing washers as well as with substantially square roofing washers. Typically, a roofing washer of either shape has a central aperture and is stackable with similar washers.

Typically, such a machine is equipped with a shuttle. The shuttle is arranged so as to displace the lowermost washer from the stack when it is desired to dispense such washer. The washer-dispensing machine may be a washer-dispensing and fastener-driving machine, as exemplified by means of the improved machine disclosed in the copending application noted above.

According to one aspect of this invention, a novel magazine is provided for such a machine. The novel magazine is operative with a stack of roofing washers with their central apertures aligned vertically. Broadly, the novel magazine comprises a washer-containing structure and a washer-restraining structure, as described below.

The washer-containing structure, which in a preferred embodiment is a box-like container, is arranged for containing such a stack of roofing washers but permitting the lowermost washer within the contained stack to be horizontally displaced from such stack. In the preferred embodiment, the lowermost washer may be horizontally displaced through means of a substantially open face of the box-like container. It is contemplated that, when it is desired to dispense the lowermost washer, the lowermost washer may be thus displaced by means of the shuttle of such a washer-dispensing machine.

It is preferred for the washer-containing structure to also permit the lowermost washer within such a stack contained by the containing means to be edgewise engaged. It is contemplated that, when it is desired to dispense the lowermost washer, the lowermost washer may be thus engaged by means of the shuttle of such a washer-dispensing machine.

The washer-restraining structure, which in the preferred embodiment comprises an elongate member, is arranged for coacting with the containing means, and with an upper group of the washers within such a stack contained by the containing means. The upper group excludes the lowermost washer within the stack. The washer-restraining structure coacts therewith so as to restrain the washers within the upper group against being inverted accidentally within the stack and against being displaced with the lowermost washer.

Preferably, the washer-restraining structure comprises an elongate member mounted upon the containing means so as to extend downwardly into the central apertures of the washers within such a stack contained by the containing structure, except for the lowermost washer within the stack.

It is preferred for the washer-containing structure to comprise outer walls defining a container with a substantially open face. These walls include a top wall, two side walls integral with the top wall, and a face wall opposite to the substantially open face and integral with the top and side walls. The container is arranged to contain such a stack of roofing washers. The substantially open face permits the lowermost washer within such a stack contained by the washer-containing structure to be horizontally displaced from the stack.

In a preferred construction, the substantially open face of the container is open between the side walls, substantially to the top wall. Also, each side wall has a flange extending inwardly from the lower edge of such side wall so as to underlie marginal portions of the lowermost washer within such a stack contained by the containing means. Moreover, the lower edge of the face wall is disposed so as to permit the lowermost washer within the stack to be edgewise engaged, as mentioned above. Furthermore, if the restraining means comprises an elongate member, as mentioned above, the elongate member is removably mounted upon to the top wall.

According to another aspect of this invention, improved features are provided in a washer-dispensing machine useful to dispense stackable roofing washers individually from a stack of such washers nested with one another. These features are useful particularly but not exclusively if each such washer has an outer margin with a circular edge.

Thus, the washer-dispensing machine with improved features provided by means of this invention comprises a base and a container, which is mounted upon the base. The container is constructed so as to contain such a stack of such roofing washers, and so as to permit the lowermost washer within the stack to be horizontally displaced from the stack, when it is desired to dispense such washer. Also, the washer-dispensing machine with improved features provided by means of this invention comprises means for restraining the remaining washers within such a stack contained by means of the container so that the remaining washers within the stack are not displaced along with the lowermost washer.

The container and restraining means described in the preceding paragraph may be advantageously provided by means of the improved magazine described above. Such container and restraining means may be alternatively provided by means of the washer-containing and washer-restraining components of the washer-dispensing and fastener-driving machine disclosed in the copending application noted above.

Furthermore, the washer-dispensing machine with improved features provided by means of this invention comprises a shuttle. The shuttle is mounted upon the base for horizontal movement between a washer-engaging position and a washer-releasing position. The shuttle is adapted to engage the lowermost washer within such a stack contained by means of the container and to displace the lowermost washer as the shuttle moves from the washer-engaging position to the washer-releasing position. The shuttle is adapted to release the displaced washer as the shuttle subsequently moves from the washer-releasing position back to the washer-engaging position. The shuttle includes means for overlying a portion of the outer margin of the lowermost washer within such a stack contained by means of the container upon engagement of the shuttle with the lowermost washer and means for underlying at least a portion of the outer margin of the lowermost washer upon engagement of the shuttle therewith.

Preferably, the overlying means comprises a blade-like member. Such a member is useful particularly but not exclusively if the outer margin of each washer has a circular edge.

Also, in a preferred construction, the washer-dispensing machine with improved features provided by means of this invention comprises means mounted upon the base for providing a positive stop for such a washer displaced by means of the shuttle when the shuttle reaches the first position. Preferably, if each washer has an outer margin with a circular edge, the positive stop has a concave portion adapted to receive such a washer displaced by means of the shuttle. The concave portion may be V-shaped.

BRIEF DESCRIPTION OF THE DRAWINGS

These and other objects, features, and advantages of this invention will become evident from the following description of a preferred embodiment of this invention, with reference to the accompanying drawings, in which like reference characters designate like or corresponding parts throughout the several views, and wherein:

FIG. 1 is a partly fragmentary, upper perspective view of a washer-dispensing and fastener-driving machine constituting a preferred embodiment of this invention. Such machine is shown as provided with a novel magazine according to one aspect of this invention.

FIGS. 2 and 3 are enlarged, perspective views of the novel magazine, as seen from different vantages. A stack of roofing washers, which the novel magazine is designed to contain, is shown in phantom lines in FIG. 2. A portion of one such washer is shown in full lines in FIG. 3.

FIG. 4 is a sectional view of the novel magazine, as taken along line 4—4 of FIG. 2, in a direction indicated by means of the arrows. Three such washers are shown in full lines.

FIG. 5 on a larger scale compared to FIGS. 2 through 4, is a sectional view of the novel magazine, as taken along line 5—5 of FIG. 2, in a direction indicated by means of the arrows. One such washer is shown in full lines.

FIG. 8, on a larger scale compared to FIGS. 6 and 7, is a fragmentary, upper plan view of the shuttle of the same machine. An outline of one such washer is shown in phantom lines.

FIG. 9, on an even larger scale as compared to that of FIG. 8, is a sectional view of the shuttle, as taken along line 9—9 of FIG. 8, in a direction indicated by arrows.

FIGS. 10 and 11, on an intermediate scale compared to FIGS. 6 and 7 and to FIG. 8, are fragmentary, cross-sectional details showing sequential operations of the shuttle and certain associated components of the same machine.

DETAILED DESCRIPTION OF THE PREFERRED EMBODIMENT

Figure 6:
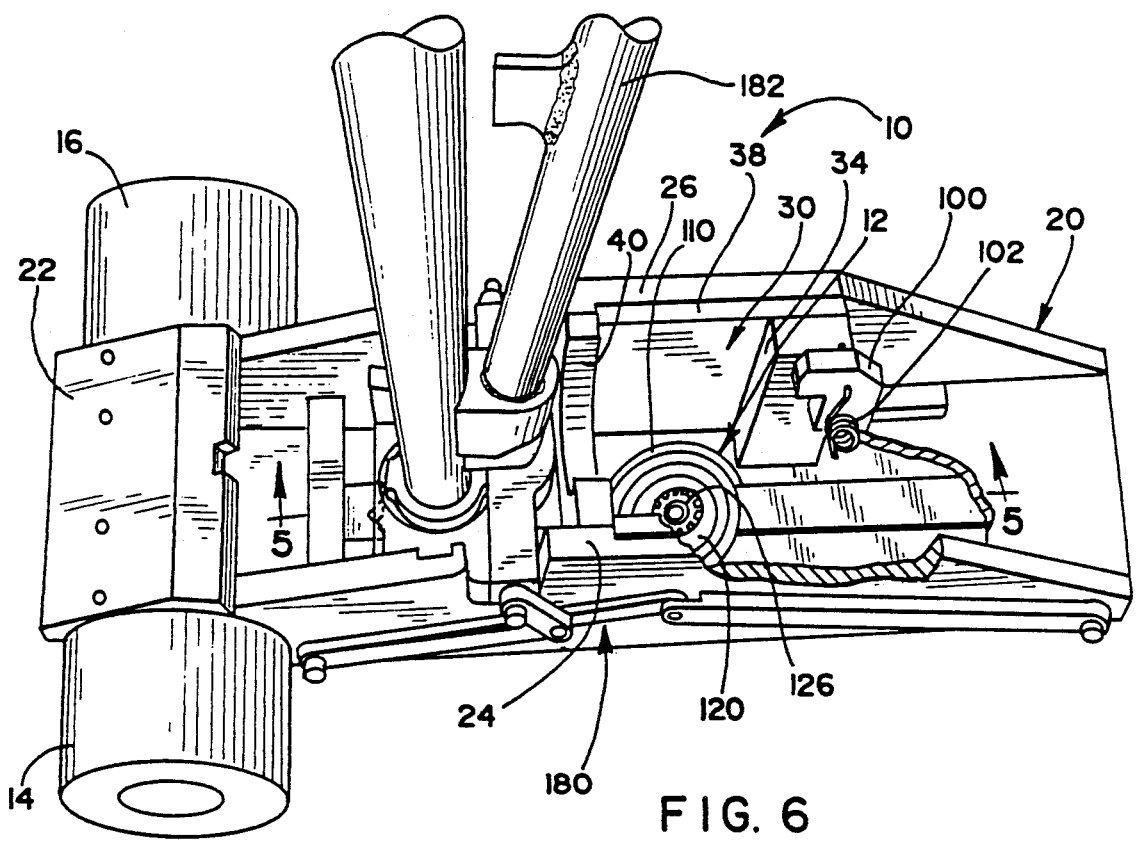
FIG. 6, on a larger scale compared to FIG. 1, is a partly fragmentary, upper perspective view of the washer-dispensing and fastener-dispensing machine shown in FIG. 1, as seen without the novel magazine shown in FIGS. 2 through 5. One such washer is shown in full lines.

While this invention is susceptible of an embodiment in various forms, there is shown in the drawings and will be hereinafter described a preferred embodiment, with the understanding that the present disclosure is to be considered as an exemplification of the invention and is not intended to limit this invention to the specific embodiment illustrated.

Figure 7:
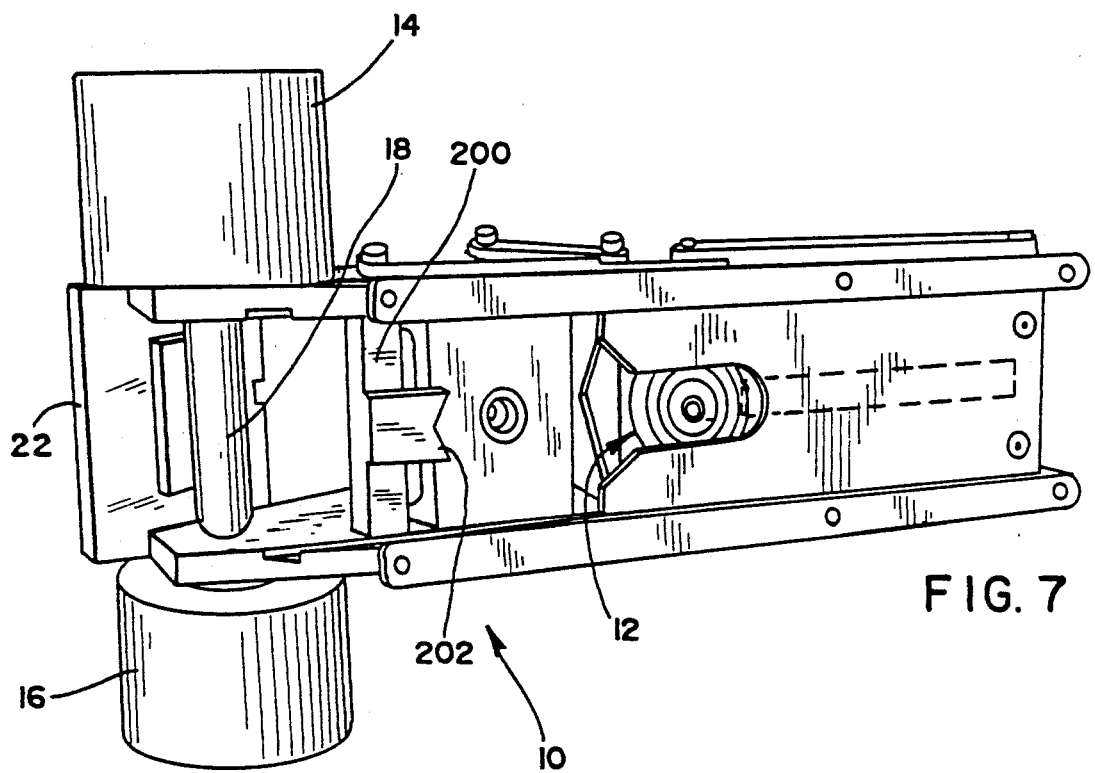
FIG. 7, on a similar scale as that of FIG. 6, is a lower perspective view of the same machine. One such washer is shown in full lines.

A washer-dispensing and fastener-driving machine 10, as shown in FIGS. 1, 6 and 7, constitutes the preferred embodiment of this invention. The machine 10, except as described herein, is similar to the washer-dispensing and fastener-driving machine illustrated and described as a preferred embodiment in the copending application noted above and functions similarly. The copending application noted above is incorporated herein by reference.

The machine 10 is used to fasten a sheet or sheets of roofing material, such as, for example, a roofing membrane overlying a blanket of roofing insulation, to an underlayment, such as, for example, a wooden roof or a corrugated metal roof, by means of roofing screws having heads and integral washers. The sheet of roofing material, the underlayment, and the screws are not shown. A composite roofing washer 12, which is to be later described, is disposed between the head and integral washer of each roofing screw and the sheet of roofing material. The machine 10 dispenses such washers 12 individually onto the sheet of roofing material, at spaced intervals, and drives such a screw through a central aperture of each dispensed washer 12, through the sheet or sheets of roofing material, and into the underlayment, until the head and integral washer of the driven screw bear against such dispensed washer 12. The machine 10 is equipped with a pair of rollers 14, 16, which are journalled upon opposite ends of an axle 18. The rollers 14, 16, enable the machine 10 to be manually moved to another location.

The machine 10 comprises a base 20, which conforms substantially to the base disclosed in the copending application noted above. A kick plate 22 is mounted upon the base 20, between the rollers 14, 16, as shown. The base 20 includes two side plates 24, 26, and other components, which are assembled in a manner disclosed in the copending application noted above. Also, the axle 18 extends through suitable apertures defined within the side plates 24, 26.

The machine 10 comprises a magazine-receiving chute 30, which is defined by means of two front uprights 32, 34, two side walls 36, 38, and a rear wall 40. The front uprights 32, 34, the side walls 36, 38, and the rear wall 40 are assembled by machine screws (not shown) to the side plates 24, 26.

A gate 42, as best seen in FIGS. 10 and 11, is provided, which is similar to the gate disclosed in the copending application noted above, and which functions similarly. The gate 42 is mounted upon the base 20, beneath the rear wall 40, for vertical movement through means of a limited range toward and away from a lowermost position which is shown in FIG. 10. The gate 42 is biased toward the lowermost position by means of coiled springs 44 (one shown) acting between the rear wall 40 and the gate 42.

In accordance with an important aspect of this invention, a magazine 50 is removably inserted into the magazine-receiving chute 30. The magazine 50 comprises, as a washer-containing structure, a substantially box-like container 52, as defined by means of a top wall 54, two side walls 56, 58, and a face or front wall 60. The side walls 56, 58, are integral with the top wall 54. The face or front wall 60 is integral with the top wall 54, and with the side walls 56, 58.

The container 52 has a substantially open face opposite to the face or front wall 60. The substantially open face is open between the side walls 56, 58, from the lower edges of the side walls 56, 58, substantially to the top wall 54. The substantially open face is bounded at its upper edge by means of a narrow strip 62, which is integral with the top wall 54, and with the side walls 56, 58. The narrow strip 62 reinforces the container 52.

The side wall 56 is provided at its lower edge with a flange 66 extending inwardly. The side wall 58 is provided at its lower edge with a flange 68 extending inwardly. Except for the flanges 66, 68, the box 52 is open at its lower end.

The face or front wall 60 has a lower edge 70, which is spaced above a plane comprising the lower edges of the side walls 56, 58. The side walls 56, 58, are cut-away as shown in FIGS. 3 and 4, respectively at curved edges 72, 74, which meet the lower edge 70 of the front or face wall 60.

The magazine 50 further includes, as a washer-restraining structure, an elongate, substantially rigid rod 80, which is removably mounted within or upon the top wall 54 so as to extend downwardly, as shown. A tubular fitting 82 having an annular flange 84 at its lower end and defining therein an upwardly opening, J-shaped slot 86 extends through a central aperture 88 defined within the top wall 54. The tubular fitting 82 is welded at the annular flange 84. A knob 90 is mounted at a threaded connection (not shown) to the upper end of the rod 80 and is secured thereto by means of a locking nut 92. A coiled spring 94, which is deployed around the rod 80, between the tubular fitting 82 and the locking nut 92, biases the rod 80 upwardly. A pintle 96, which extends radially and integrally from the rod 80, coacts with the upwardly opening, J-shaped slot 80 so as to enable the rod 86 to be removably mounted within or upon the top wall 54.

Means are provided for releasably latching the magazine 50 when the magazine 50 is received by means of the chute 30. The latching means comprises a horizontal rib 98, which is welded to the front or face wall 60 of the container 52, and a latching hook 100, which is mounted upon the front upright 32 by means of a stub shaft (not shown) enabling the latching hook 100 to rotate in a latching direction, which is counterclockwise in FIGS. 1 and 6, and to rotate in an opposite direction as well. The latching hook 100 is biased in the latching direction by means of a coiled spring 102 deployed around the stub shaft. The coiled spring 102 coacts between the front upright 32 and the latching hook 100. The latching hook 100 must be rotated or pivoted in the opposite direction so as to permit the magazine 50 to be inserted in the downward direction into the chute 30. Next, when the magazine 50 is received by means of the chute 30 and the latching hook 100 is released, the latching hook 100 overlies the horizontal rib 98 so as to releasably latch the magazine 50 within the chute 30.

When the rod 80 is removed from the top wall 54, the container 52 can be easily filled with a stack of such roofing washers 12, through means of the substantially open face of the container 52. When the rod 80 is remounted upon or within the top wall 54, the rod 80 extends downwardly into the central apertures of the roofing washers 12 within the stack of washers contained by means of the container 52, except for the lowermost washer 12 of the contained stack. The rod 80 is sized so as not to extend below the washer 12 overlying the lowermost washer 12 of the contained stack. When the lowermost washer 12 of the stack is displaced horizontally from the stack (in a manner to be later described) the rod 80 restrains the remaining washers 12 of the stack against being displaced horizontally from the stack. Moreover, if the machine 10 is tipped accidentally or deliberately, the rod 80 restrains the remaining washers 12 of the stack against being inverted accidentally within the container 52 and prevents those washers 12 that are above the rear wall 40 of the chute 30 from accidentally falling out of the container 52.

As shown, each composite roofing washer 12 comprises a metal washer plate 110. The metal washer plate 110 is stamped from a sheet of galvanized steel so as to be generally circular around its outer edge 112, so as to have annular reinforcing ribs, and so as to have a countersunk portion 114. The countersunk portion 114 includes a central aperture, which is circular.

Moreover, each composite roofing washer 12 comprises a thermoplastic insert 120 molded from a polymeric material, such as, for example, high density polyethylene or polypropylene. High density polyethylene is preferred. The thermoplastic insert 120 is molded so as to have a central hub 122. The central hub 122 is split diametrically into two halves, which are snap-fitted or molded through the central aperture of the metal washer plate 110. Flanged portions of the halves of the central hub 122 fit beneath the metal washer plate 110 so as to interlock the thermoplastic insert 120 with the metal washer plate 110.

The thermoplastic insert 120 has a central aperture extending through the central hub 122 and constituting the central aperture of the composite roofing washer 12. The thermoplastic insert 120 has a central socket 126, which is adapted to receive the head and integral washer of one of the screws mentioned above. The central socket 126 has an annular lip adapted to be snap-fitted over the integral washer received by means of the central socket 126

In a stack of such washers 12, except for the uppermost and lowermost washers 12 of the stack, the central hubs 122 nest into the central sockets 126.

Suitable composite roofing washers, as exemplified by means of the composite roofing washers 12, and suitable screws, as mentioned herein, are available commercially from ITW-Buildex (a division of Illinois Tool Works Inc.) of Itasca, Illinois.

The machine 10 comprises a shuttle 130, which is mounted upon the base 20 for horizontal movement between a washer-engaging position and a washer-releasing position. Broadly, except as otherwise described herein, the shuttle 130 is similar to the shuttle of the improved machine disclosed in the copending application noted above and functions similarly. However, as described herein, the shuttle 130 embodies important features distinguishing the shuttle 130 from the previously disclosed shuttle of the co-pending application. In the copending application noted above, the normal position of the shuttle described therein corresponds to the washer-releasing position of the shuttle 130, and the displaced position of the shuttle described therein corresponds to the washer-engaging position of the shuttle 130.

As shown in FIGS. 8 and 9, the shuttle 130 has opposite, coplanar, gate-supporting surfaces 132, 134, along its side edges 136, 138. The side edges 136, 138, fit slidably into longitudinal grooves defined within the side plates 24, 26, as shown in FIG. 9, in which the side plates 24, 26, are shown fragmentarily, in phantom lines. The shuttle 130 has longitudinal grooves 140, 42, which divide the gate-supporting surfaces 132, 134, into a washer-supporting surface 144 of the shuttle 130 and a washer-driving portion 146 of the shuttle 30.

The gate-supporting surfaces 132, 134, define a plane coinciding with the lowermost position of the gate 42. In its lowermost position, the gate 42 rests upon the gate-supporting surfaces 132, 134. The washer-supporting surface 144 is U-shaped and encompasses a rearwardly opening, U-shaped cut-out 148 within the shuttle 130, as shown. The washer-supporting surface 144 defines a plane, which is spaced below the plane defined by means of the gate-supporting surfaces 132, 134. The washer-driving portion 146 has a concave edge 150, which conforms substantially to the outer edge 112 of the metal washer plate 110 of each composite roofing washer 12. The concave edge 150 terminates at the washer-supporting surface 144.

Thus, the shuttle 130 is adapted to engage one of the washers 12, as suggested by means of the phantom lines in FIG. 8, so that marginal portions of its metal washer plate 110 rest upon the washer-supporting portion 144, between the gate-supporting portions 132, 134, so that its countersunk portion 114 is accommodated within the U-shaped cut-out 148, and so that an arcuate portion of the outer edge 112 of its metal washer plate 110 is embraced by means of the concave edge 150 of the washer-driving portion 146.

A blade-like member 160 is welded onto the washer-driving portion 146 as to extend longitudinally along the washer-driving portion 146. A tip portion 162 of the blade-like member 160 extends over the concave edge 150 of the washer-engaging portion 144. When such a washer 12 is engaged by means of the shuttle 130 so that the washer-supporting portion 144 supports marginal portions of the same washer 12, and so that an arcuate portion of the outer edge 112, of its metal part 110 is embraced by means of the concave edge 150 of the washer-engaging portion 144, the tip portion 162 overlies a part of the arcuate portion embraced by means of such edge 150.

A brace 170 (see FIG. 8) is fixed by means of machine screws (not shown) to the shuttle 130. The brace 170, at its opposite ends, has pivot pins 172, 174. The pivot pin 172 extends through a longitudinal slot 176 (see FIG. 1) defined within the side plate 24. The pivot pin 174 extends through a similar slot (not shown) defined within the side plate 26.

The washer-dispensing and fastener-driving machine 10 comprises shuttle-biasing means, shuttle-moving means, and fastener-driving means similar to that disclosed in the copending application noted above and which function similarly. These means include a mechanical linkage 180, which is similar to the mechanical linkage disclosed in the copending application noted above. The shuttle 130 is biased by the shuttle-biasing means (not shown) to its washer-releasing position and is linked by means of the pivot pins 172, 174, to the mechanical linkage 180. Actuation of the mechanical linkage 180 so as to move the shuttle 130 to its washer-engaging position from its washer-releasing position is effected by means of manual movement of a screw-feeding tube 182 in a downward direction and is similar to actuation of the mechanical linkage disclosed in the copending application noted above. The screw-feeding tube 182 is similar to a screw-feeding tube disclosed in the same application.

When the shuttle 130 is used to displace one of the aforenoted washers 12 to the washer-releasing position of the shuttle 130 (see FIG. 11) the displaced washer 12 is positioned beneath a nosepiece 190. The nosepiece 190 is welded to the bight 192 of a U-shaped bracket 194, which is mounted by means of machine screws (not shown) between the side plates 24, 26. An aperture 195 permitting a screw to pass therethrough is provided within the bight 192 of the bracket 194. The nosepiece 190, which is one component of the fastener-driving means of the machine 10, is similar to the nosepiece disclosed in the copending application noted above. The bracket 194 is similar to the U-shaped bracket disclosed in the same application.

A cross-piece 200 having a concave, V-shaped portion 202 (see FIGS. 7, 10 and 11) is mounted by means of machine screws (not shown) between the side plates 24, 26. The cross-piece 200, at the V-shaped portion 202, provides a positive stop for the displaced washer 12. The V-shaped portion 202 engages the circular edge of the displaced washer 12 so as to center the displaced washer 12 beneath the nosepiece 190.

After the displaced washer 12 has been centered beneath the nosepiece 190 and the shuttle 130 has moved from its washer-releasing position to its washer-engaging position, the fastener-driving means of the machine 10 may then be operated so as to drive a screw having a head and an integral washer through the central aperture of the displaced washer 12, through the sheet or sheets of roofing material, and into the underlayment, until the head and integral washer of the screw are received by means of the central socket 126 of the displaced washer 12. The operation of the fastener-driving means of the machine 10 is similar to the operation of the fastener-driving means disclosed in the copending application noted above.

Numerous modifications and variations may be effected without departing from the scope and spirit of this invention. It is therefore to be understood that within the scope of the appended claims, the present invention may be practiced otherwise than as specifically described herein.

We claim:

1. In combination with a washer-dispensing machine arranged to dispense stackable roofing washers having central apertures individually from a stack of such washers with their central apertures aligned vertically and equipped with a shuttle which is arranged to displace the lowermost washer from the stack of washers when it is desired to dispense the last-mentioned washer, a magazine comprising:
   (a) containing means for containing said stack of washers but permitting the lowermost washer within the contained stack of washers to be horizontally displaced from the contained stack of washers, by means of the shuttle of the washer-dispensing machine, when it is desired to dispense the last-mentioned washer; and
   (b) restraining means for coacting with the containing means, and with said stack of washers contained by the containing means, for restraining said stack of washers by engaging all of said washers within said stack of washers except for the lowermost washer within the contained stack, and for restraining the washers within said stack of washers against being inverted accidentally if the washer-dispensing machine is tipped and against being displaced along with the lowermost washer within the contained stack of washers.

2. The magazine of claim 1 wherein the containing means is constructed so as to permit the lowermost washer in such a stack contained by the containing means to be edgewise engaged, by the shuttle of the washer-dispensing machine, when it is desired to dispense the last-mentioned washer.

3. The magazine of claim 1 wherein the restraining means comprises an elongate member mounted upon the containing means so as to extend downwardly into the central apertures of the washers in such a stack contained by the containing means except for the lowermost washer in the contained stack.

4. The magazine of claim 3 wherein the containing means is constructed so as to permit the lowermost washer in such a stack contained by the containing means to be edgewise engaged, by the shuttle of the washer-dispensing machine, when it is desired to dispense the last-mentioned washer.

5. The magazine of claim 1 wherein the containing means comprises outer walls defining a container arranged to contain such a stack of roofing washers, the container having a substantially open face permitting the lowermost washer in such a stack contained by the containing means to be horizontally displaced from the contained stack, said walls including a top wall, two side walls integral with the top wall, and a face wall opposite to the substantially open face and integral with the top and side walls.

6. The magazine of claim 5 wherein the side and face walls respectively have lower edges, and wherein the substantially open face is open between the side walls, from the lower edges of the side walls substantially to the top wall.

7. The magazine of claim 6 wherein each side wall has a flange extending inwardly from the lower edge of such side wall so as to underlie marginal portions of the lowermost washer in such a stack contained by the container.

8. The magazine of claim 7 wherein the lower edge of the face wall is disposed so as to permit the lowermost washer in such a stack contained by the container to be edgewise engaged at a location near the lower edge of the face wall, by the shuttle of the washer-dispensing machine, when it is desired to dispense the last-mentioned washer.

9. The magazine of claim 5 wherein the restraining means comprises an elongate member removably mounted upon to the top wall so as to extend downwardly into the central apertures of the washers in such a stack contained by the container except for the lowermost washer in the contained stack.

10. The magazine of claim 9 wherein the side and face walls respectively have lower edges, wherein the substantially open face is open between the side walls, from the lower edges of the side walls substantially to the top wall, wherein each side wall has a flange extending inwardly from the lower edge of such side wall, so as to underlie the lowermost washer in such a stack contained by the container, and wherein the lower edge of the face wall is disposed so as to permit the lowermost washer in such a stack contained by the container to be edgewise engaged at a location near the lower edge of the face wall, by the shuttle of the washer-dispensing machine, when it is desired to dispense the last-mentioned washer.

11. A washer-dispensing machine for dispensing stackable roofing washers individually from a stack of such washers wherein each such washer has an outer margin, and wherein the washers within the stack are nested with one another, comprising:
   (a) a base;
   (b) a container mounted upon said base and constructed so as to contain said stack of washers, and so as to permit the lowermost washer within the contained stack of washers to be horizontally displaced from the stack;
   (c) means operative when the lowermost washer within said stack of washers contained by the container is being displaced horizontally from the contained stack for restraining said stack of washers by engaging all of said washers within said stack of washers except for the lowermost washer within the contained stack of washers so that the washers within the contained stack of washers, other than said lowermost washer, are not displaced along with the lowermost washer of the contained stack of washers; and
   (d) a shuttle, which is mounted upon said base for horizontal movement between a washer-engaging position and a washier-releasing position, which is adapted to engage the lowermost washer within said stack of washers contained by the container and to displace the last-mentioned washer from the contained stack of washers as the shuttle moves from the washer-engaging position to the washer-releasing position, and which is adapted to release the displaced washer as the shuttle next moves from the washer-releasing position back to the washer-engaging position, the shuttle including means for overlying a portion of the outer margin of the lowermost washer within said stack of washers contained by the container upon engagement by the shuttle with the last-mentioned washer and means for underlying at least a portion of the outer margin of the last-mentioned washer upon engagement by the shuttle therewith.

12. The washer-dispensing machine of claim 11 further comprising:
   (e) means mounted upon the base for providing a positive stop for said lowermost washer displaced by the shuttle when the shuttle reaches the second washer releasing position.

13. The washer-dispensing machine of claim 12 wherein the positive stop has a concave portion adapted to receive such a displaced washer having an outer margin with a circular edge.

14. The washer-dispensing machine of claim 13 wherein the concave portion of the positive stop is V-shaped.

15. The washer-dispensing machine of claim 11 wherein the means for overlying a portion of the outer margin of the lowermost washer of such a stack contained by the container upon such engagement of the shuttle therewith comprises a blade-like member.

16. A washer-dispensing machine for individually dispensing stackable roofing washers, having central apertures defined therein, from a stack of said washers wherein said central apertures are aligned vertically with respect to each other, by means of a shuttle which is adapted to displace the lowermost washer from said stack of washers, when it is desired to dispense said lowermost washer, as a result of said shuttle moving from a washer-engaging position to a washer-releasing position, comprising:
   container means for containing said stack of washers but permitting said lowermost washer of said stack of washers to be horizontally displaced from said stack of washers by means of said shuttle when said shuttle is moved from said washer-engaging position to said washer-releasing position; and
   restraining means operatively associated with said container means and said stack of washer disposed within said container means for restraining said stack of washers disposed within said container means by engaging all of said washers disposed within said container means except for the lowermost washer within said stack of washers disposed within said container means so as to permit only said lowermost washer within said stack of washers disposed within said container means to be dispensed from said container means by said shuttle as said shuttle moves from said washer-engaging position to said washer-releasing position.

17. A washer-dispensing machine as set forth in claim 16, wherein:
   said container means comprises two side walls, an end wall, and a top wall; and
   said restraining means comprises a rod fixedly mounted upon said top wall of said container means and extending downwardly therefrom so as to be disposed within each of said central apertures of said washers disposed within said stack of washers within said container means except for said central aperture of said lowermost washer.

18. A washer-dispensing machine as set forth in claim 17, further comprising:
   chute means defined within said machine for housing said container means;
   rib means defined upon an external surface of said end wall of said container means; and
   latching means disposed upon said chute means of said machine for engaging said rib means of said container means.

19. A washer-dispensing machine as set forth in claim 16, wherein:
   said shuttle comprises means for overlying and underlying marginal portions of said lowermost washer when said shuttle engages said lowermost washer as said shuttle moves from said washer-engaging position to said washer-releasing position.

20. A washer-dispensing machine as set forth in claim 19, wherein:
   said shuttle includes a substantially U-shaped portion for supporting additional marginal portions of said lowermost washer as said lowermost washer is moved from said washer-engaging position to said washer-releasing position.

* * * * *